(12) United States Patent
Sheerin

(10) Patent No.: US 10,978,758 B2
(45) Date of Patent: Apr. 13, 2021

(54) AIR METAL BATTERY HAVING A ROTATING ANODE AND A CATHODE ASSEMBLY

(71) Applicant: ALUMAPOWER CORPORATION, Huntsville (CA)

(72) Inventor: Geoffrey T. Sheerin, Sarnia (CA)

(73) Assignee: AlumaPower Corporation, Huntsville (CA)

( * ) Notice: Subject to any disclaimer, the term of this patent is extended or adjusted under 35 U.S.C. 154(b) by 0 days.

(21) Appl. No.: 16/498,770

(22) PCT Filed: Oct. 3, 2018

(86) PCT No.: PCT/IB2018/001264
§ 371 (c)(1),
(2) Date: Sep. 27, 2019

(87) PCT Pub. No.: WO2019/069139
PCT Pub. Date: Apr. 11, 2019

(65) Prior Publication Data
US 2020/0388895 A1 Dec. 10, 2020

Related U.S. Application Data

(60) Provisional application No. 62/720,957, filed on Aug. 22, 2018, provisional application No. 62/567,963, filed on Oct. 4, 2017.

(51) Int. Cl.
*H01M 12/06* (2006.01)
*H01M 12/02* (2006.01)
(Continued)

(52) U.S. Cl.
CPC ............. *H01M 12/02* (2013.01); *H01M 2/40* (2013.01); *H01M 4/38* (2013.01); *H01M 12/06* (2013.01);
(Continued)

(58) Field of Classification Search
CPC ........ H01M 12/02; H01M 4/38; H01M 12/06; H01M 2/40; H01M 2004/027; H01M 2004/025
See application file for complete search history.

(56) References Cited

U.S. PATENT DOCUMENTS 3,663,298 A * 5/1972 McCoy ................. H01M 10/28
429/404
4,053,685 A 10/1977 Rowley et al.
(Continued)

FOREIGN PATENT DOCUMENTS

GB 2538076 11/2016
WO WO2016178017 11/2016

OTHER PUBLICATIONS

ISA/CA; International Search Report/Written Opinion dated Feb. 20, 2019 in corresponding International Application PCT/IB2018/001264.

*Primary Examiner* — Cynthia K Walls
(74) *Attorney, Agent, or Firm* — Peter J. Mikesell; Schmeiser, Olsen & Watts, LLP

(57) ABSTRACT

A metal air battery system having a rotating anode/cathode assembly. The assembly is mounted in a housing system that provides a mechanism for loading of fresh metal anodes for the purpose of mechanical recharge of the battery. The anode and cathode are able to rotate at high speed for the purposes of producing local high centrifugal (g) forces on their respective surfaces for the purpose of wiping clean liquid electrolyte from their surface to provide for almost instantaneous shutdown of chemical reactions producing hydrogen gas and electric current. The anode and cathode are also rotated at slower speeds for the purpose of providing an even corrosion of the metal anode surface and the cathode rides on the liquid electrolyte using a dynamic and or static liquid (Continued)

bearing design. This liquid bearing provides a constant distance and therefore electrical resistance in the battery.

19 Claims, 19 Drawing Sheets

(51) Int. Cl.
*H01M 4/38* (2006.01)
*H01M 2/40* (2006.01)
*H01M 4/02* (2006.01)
(52) U.S. Cl.
CPC .......................... *H01M 2004/025* (2013.01); *H01M 2004/027* (2013.01)

(56) References Cited

U.S. PATENT DOCUMENTS

| | | |
|---|---|---|
| 4,491,624 A | 1/1985 | Sarbacher et al. |
| 4,521,497 A | 6/1985 | Tamminen |
| 4,950,561 A | 8/1990 | Niksa et al. |
| 6,127,061 A | 10/2000 | Shun et al. |
| 6,299,998 B1 | 10/2001 | Morris et al. |
| 6,383,673 B1 | 5/2002 | Faris et al. |
| 2017/0047626 A1 | 2/2017 | Englert |

* cited by examiner

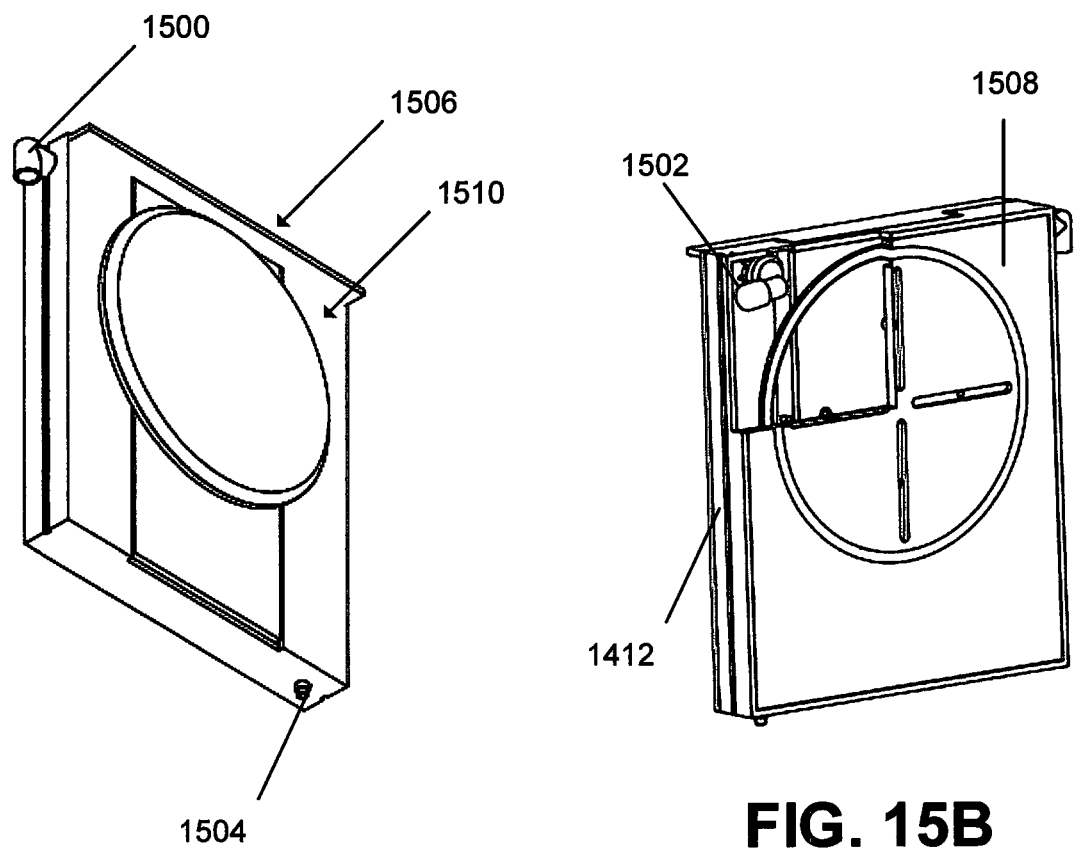
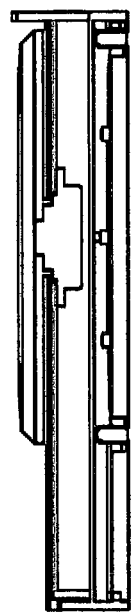
FIG. 15A
FIG. 15B
FIG. 15C

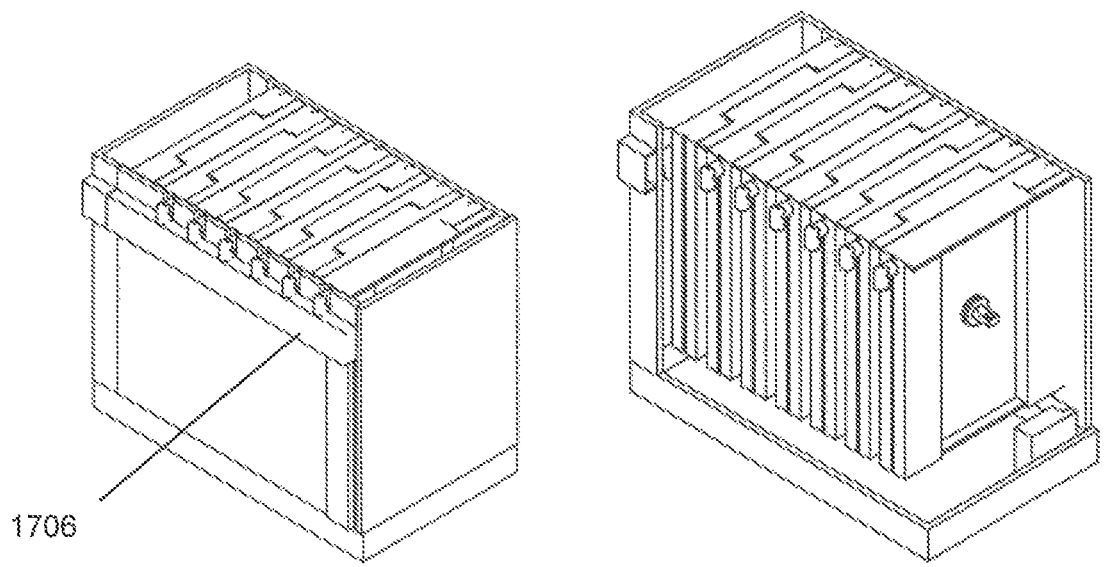
FIG. 17A
FIG. 17B
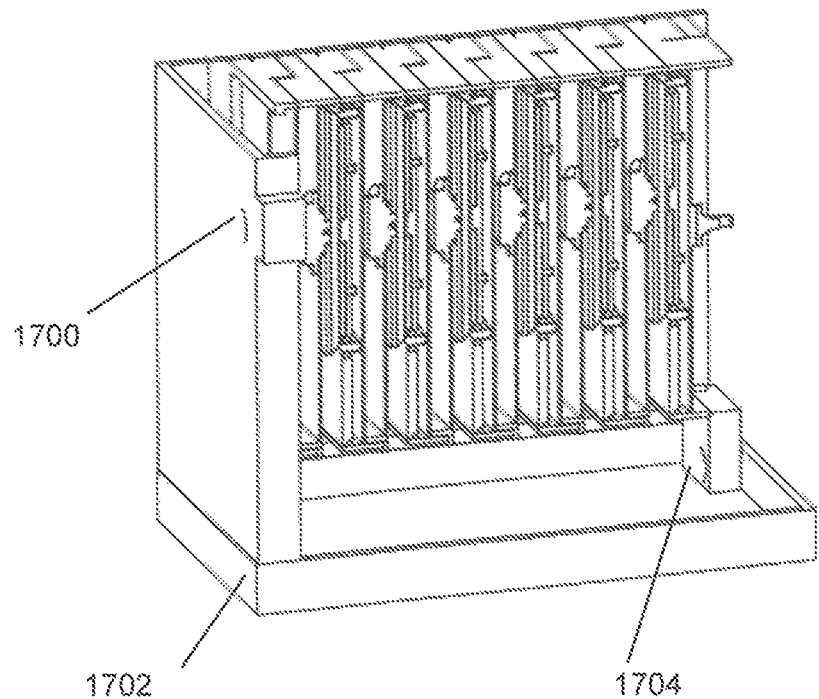
FIG. 17C

FIG. 18A  FIG. 18B

US 10,978,758 B2

AIR METAL BATTERY HAVING A ROTATING ANODE AND A CATHODE ASSEMBLY

CROSS-REFERENCE TO RELATED APPLICATIONS

This application claims priority to and is a non-provisional of U.S. Patent Applications 62/567,963 (filed Oct. 4, 2017), 62/720,957 (filed Aug. 22, 2018) the entirety of which are incorporated herein by reference.

BACKGROUND OF THE INVENTION

The subject matter disclosed herein relates to metal air batteries. Metal air batteries provide high energy density power sources that show promising applications as mobile and stationary distributed power sources. They have the potential to replace the internal combustion engines found in hybrid cars and aircraft since the energy density, efficiency of conversion approach those of hydrocarbon fuels.

FIG. 1 depicts a schematic representation of a conventional aluminum-oxygen cell system 100. The system 100 comprises an air metal battery 102, an air blower 104 or an oxygen supply 106 and a carbon dioxide scrubber 108. An electrolyte tank 110 with a filter 112 is also present. A coolant system with a heat exchanger 114 and pump 116 is provided. An electrolyte pump 118 sends electrolyte through the air metal battery 102 and a gas separator 120. A knockout tank 122 and hydrogen disposal system 124 are also present.

FIG. 2 depicts a portion of the air metal battery 102 in further detail. A metal anode 200, an electrolyte 202 and an air breathing cathode 204 is shown. The air breathing cathode 204 may contain a conductive charge collecting screen embedded in a conductive matrix that contains a catalyst that promotes the reduction of oxygen. There is a hydrophobic layer that is porous to gas but not the liquid electrolyte. The oxygen needed for the chemical reaction can penetrate the air breathing cathode 204 but still hold the liquid electrolyte in place against the surface of the anode. The metal anode 200 is made from a variety of metals such as zinc, magnesium, iron and aluminum. In one embodiment, the metal anode 200 is aluminum due to the low cost and density of the material.

Metal air batteries are known to suffer from parasitic corrosion problems. Corrosion of edges of anode plates and parasitic corrosion of the surface changes the shape and the $I^2R$ losses (electrical resistance) due to the changing distance between the anode and cathode due to this corrosion. The mechanical loading of new metal anodes requires a high integrity edge seal on the metal anode to prevent entrapment of electrolyte after the drain of a cell electrolyte.

The metal anode of a metal air battery is consumed during operation and causes some issues with performance and reliability of the system. A metal air battery that has a fixed anode cathode suffers from an increase in the resistance between the anode and cathode due to the corrosion of the metal anode surface away from the cathode. Additionally, the edges of the metal anode that is not directly parallel to the cathode have parasitic corrosion that also can produce hydrogen gas in the right circumstances. Some methods in protecting the edges of the metal anodes have been designed that are adequate in control of this issue but complicate the mechanical reload of metal anodes because perfect seal of the system is required due to the direct immersion of the anode in the electrolyte.

When the electrical circuit in a metal air battery is interrupted (e.g. turned off) the electrolyte reacts instantly with the metal to produce dangerous volumes of hydrogen gas that must be vented from the battery system. The hydrogen bubbles collect in the electrolyte rapidly and increase the electrical resistance of the battery so that even if the battery is quickly turned back on full power is not available until the electrolyte with hydrogen bubbles is flushed from the system. This pumping and flushing of the electrolyte requires a "knockout" system that separates gas and liquid so hydrogen gas can be safely removed from the system. Knockout system normally uses some type of cascade of liquid through baffles to allow for departure of gas out of solution. Attempts to drain the electrolyte out of a metal air battery does shut down the power output but has been found to result in small droplets and liquid film coatings of the metal anode that produce large amounts of hydrogen gas and corrode the metal unevenly producing pits and voids that reduce the efficiency and amount of power available from the system. As a result of these problems all metal air batteries are designed to be turned on and run until the metal anode is spent. In summary it is very difficult to turn off a metal air battery and then turn it on again without damage to the complete system so they are left on for the lifetime of the anode.

Some metal air batteries allow the anode or cathode to adjust position and follow the corrosion of the metal anode surface. This reduces the $I^2R$ losses. However, these systems do not provide for inconsistency in the electric field between different areas of the anode cathode assembly. Additionally, such systems cannot provide for complete removal of electrolyte from a previously operating system.

The discussion above is merely provided for general background information and is not intended to be used as an aid in determining the scope of the claimed subject matter.

BRIEF DESCRIPTION OF THE INVENTION

In a first embodiment, an air metal battery is provided. The air metal battery comprising: a cathode assembly having a cathode surface, the cathode assembly comprising fluid path for pumping an electrolyte fluid through the cathode assembly and out of the cathode surface, thereby producing a hydrostatic force at the cathode surface; an anode disposed proximate the cathode surface, the anode being positioned proximate to the cathode assembly by a thrust bearing that permits the anode to rotate relative to the cathode assembly; a shaft for rotating the thrust bearing, the shaft being in contact with a sliding conductor that collects electrical charge; wherein, during operation of the air metal battery, the anode remains spaced from the cathode surface by a constant distance due to a hydrodynamic force of the electrolyte fluid.

In a second embodiment, an air metal battery is provided. The air metal battery comprising: an anode disc, a cathode and an electrolyte fluid, the cathode assembly having a cathode surface and an electrical collector for collecting electricity generated by the air metal battery, the cathode assembly comprising fluid path for pumping the electrolyte fluid through the cathode assembly and out of the cathode surface, thereby producing a hydrostatic force at the cathode surface; the cathode assembly further comprising an air chamber with an air inlet and an air outlet for conveying oxygen through the air chamber and out through the cathode surface; an anode disposed proximate the cathode surface, the anode being positioned proximate to the cathode assembly by a thrust bearing that permits the anode to rotate relative to the cathode assembly; a shaft for rotating the thrust bearing, the shaft being in contact with a sliding conductor that collects electrical charge; wherein, during operation of the air metal battery, the anode disc remains spaced from the cathode surface due to a hydrodynamic force of the electrolyte fluid.

In a third embodiment, a battery assembly is provided. The battery assembly comprising: a housing enclosing multiple air metal batteries and an electrolyte fluid, each air metal battery in the multiple air metal batteries having an anode disc and a cathode assembly wherein: the cathode assembly has a cathode surface and an electrical collector for collecting electricity generated by the air metal battery, the cathode assembly comprising fluid path for pumping the electrolyte fluid through the cathode assembly and out of the cathode surface, thereby producing a hydrostatic force at the cathode surface; the cathode assembly further comprising an air chamber with an air inlet and an air outlet for conveying oxygen through the air chamber and out through the cathode surface; an anode disposed proximate the cathode surface, the anode being positioned proximate to the cathode assembly by a thrust bearing that permits the anode to rotate relative to the cathode assembly; the battery assembly further comprises a shaft for rotating each thrust bearing in the multiple air metal batteries, thereby rotating each anode disc, wherein the shaft is in contact with a sliding conductor in each air metal battery, each sliding conductor collecting electrical charge; wherein, during operation of the air metal battery, each anode disc remains spaced from a corresponding cathode surface due to a hydrodynamic force of the electrolyte fluid.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 3A is a profile view of an anode disc while

FIG. 6A is a bottom view of the cathode disc of FIG. 4 while

FIGS. 15A, 15B and 15C show additional views of the sliding load cartridge;

FIGS. 17A, 17B and 17C show a battery assembly that uses a plurality of cells;

FIG. 18A and FIG. 18B show the sliding load cartridge in use to change an anode disc, while

DETAILED DESCRIPTION OF THE INVENTION

The present disclosure pertains to a metal air battery that provides for complete, rapid shutdown of power without parasitic corrosion and production of dangerous hydrogen gas as described above. This disclosure also provides for the rapid restart to full power and production of constant power output throughout the consumption of the metal anode. Some embodiments of the disclosed air battery provide for a low cost metal anode configuration that does not need high integrity edge seals and that can be automatically loaded into the metal air battery system for the purposes of extended operation.

Figure 3A:
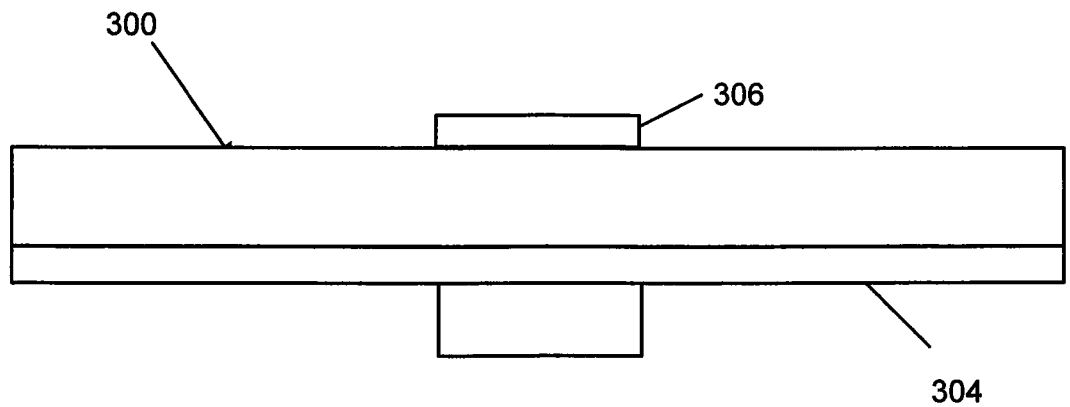
Figure 3B:
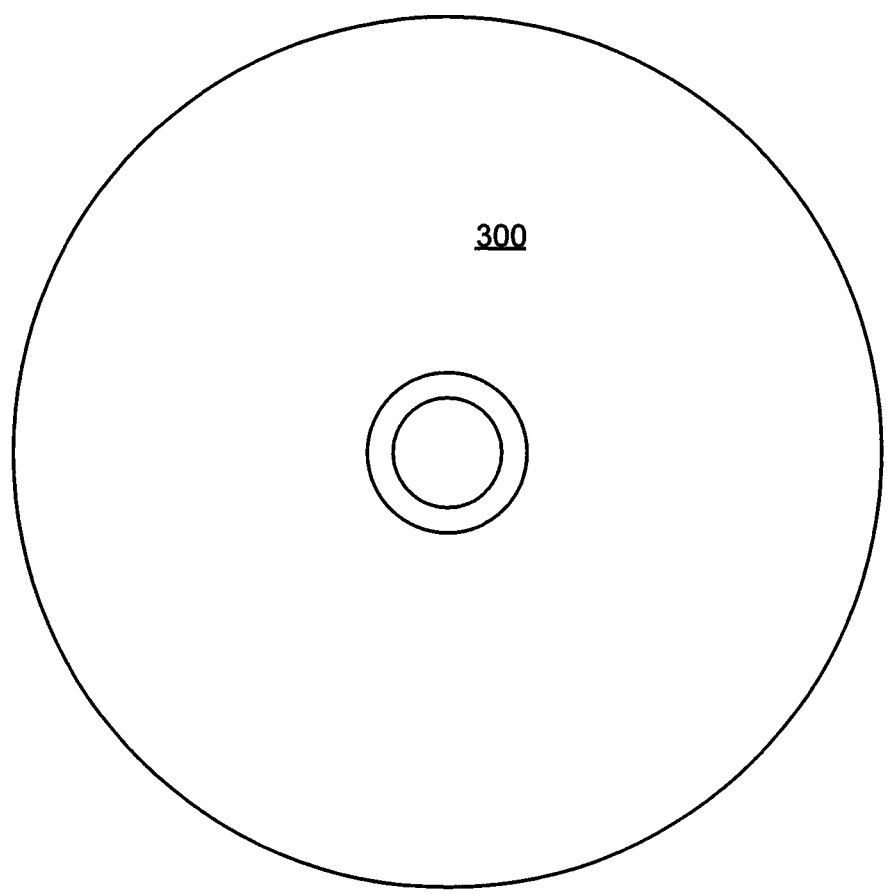
FIG. 3B is a top view of the anode disc.
Figure 4:
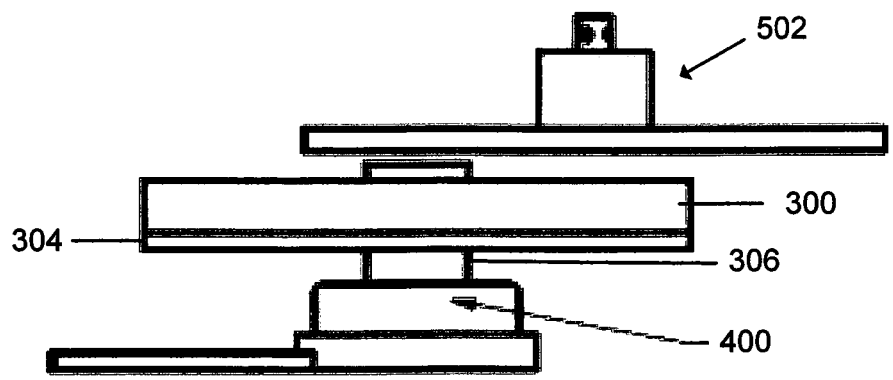
FIG. 4 is a profile view of the anode disc held partially under a cathode disc by a disc drive motor.

As shown in FIG. 3A and FIG. 3B, an anode disc 300 is shown configured to provide solutions to many conventional problems experienced by conventional air batteries. The anode disc 300 may be comprised of metal (e.g. aluminum) bonded to a plastic mounting bracket 304 of the same diameter as the anode disc 300. See FIG. 3A (side view) and FIG. 3B (top view). The plastic mounting bracket 304 has a center shaft 306 mounted to facilitate auto load onto a motorized arm 400 (see FIG. 4). The anode disc 300 is mounted on the motorized arm 400 that provides for electrical conductivity from the anode disc 300. The motorized arm 400 comprises a stationary power collector circuit that receives the electricity through wiper brushes or other inductive magnetic couplings similar to those found on electric motors.

Figure 5:
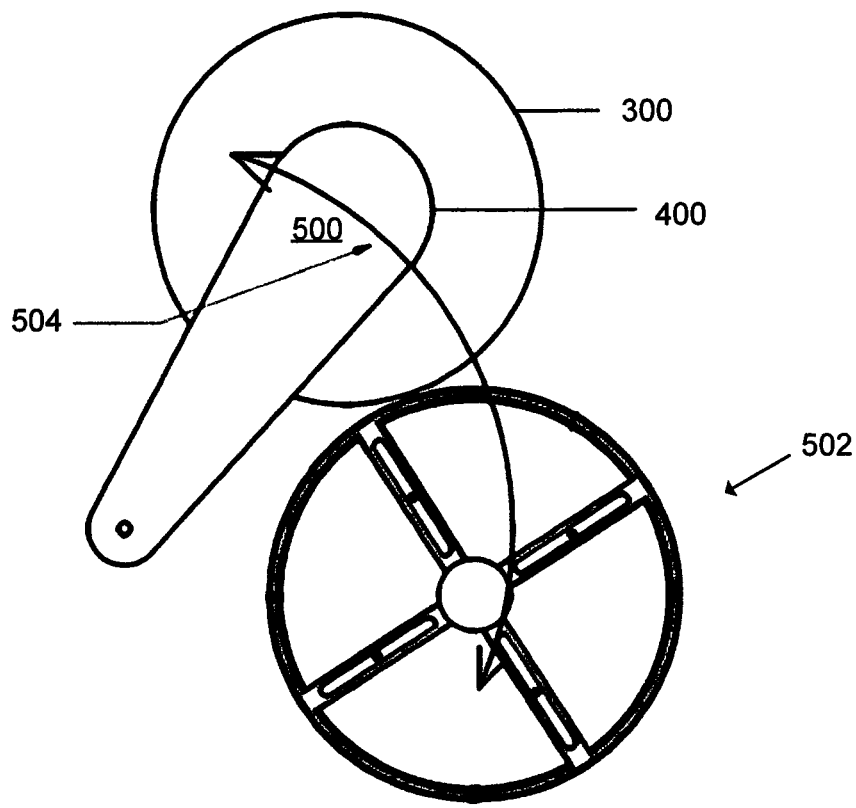
FIG. 5 is a top view for the embodiment of FIG. 4 showing movement of the anode disc relative to the cathode disc.

Referring to FIG. 5, one embodiment of the metal air battery has the anode disc 300 and motorized arm 400 mounted on a single arm pivot 500 that can move back and forth (see arrow 504) between a disc loading station (for loading a fresh disc) and battery cathode station (for operation under power). The cathode disc 502 of the battery cathode station is depicted in FIG. 5. The cathode disc 502 is designed to provide collection of the charge, allow for oxygen exchange to the reaction and provide active electrode spacing by liquid dynamic and static bearing.

Figure 6A:
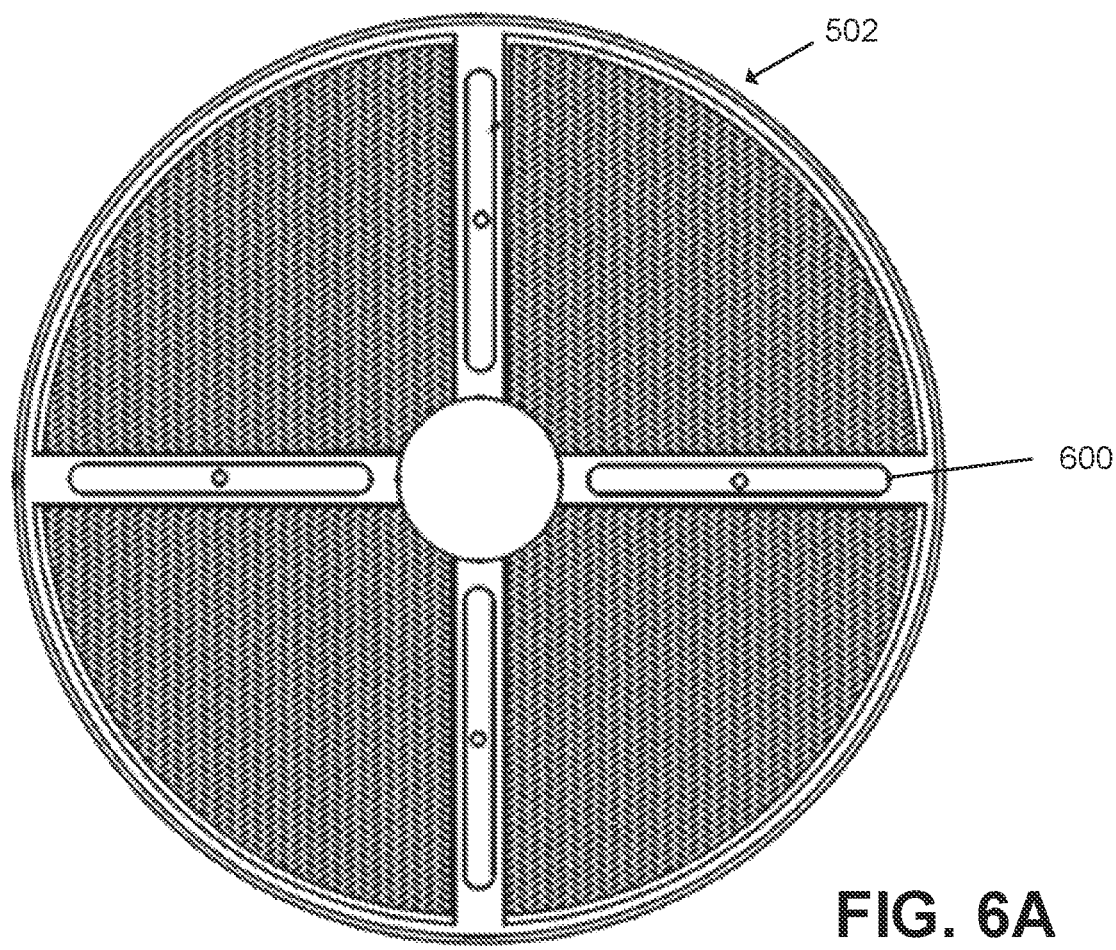
Figure 6B:
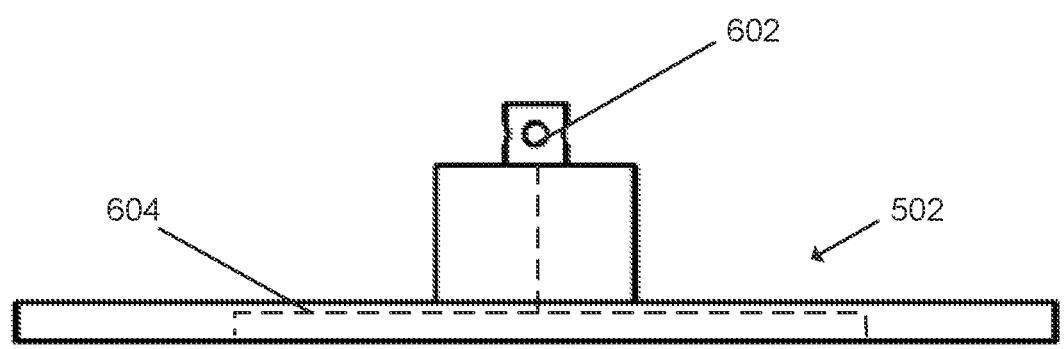
FIG. 6B is a profile view of the cathode disc.

Referring to FIG. 6A (bottom view) and FIG. 6B (side view), the cathode disc 502 has surface liquid bearing channels 600 through which electrolyte liquid is pumped that allows the cathode disc 502 to "float" above the surface of the anode disc 300. Electrolyte enters at feedhole 602 and travels through fluid path 604 to exit channels 600. The cathode disc 502 is fixed in position flat above the anode disc 300 and can move in a vertical up and down manner to follow of the surface of the anode disc 300 as it chemically mills back towards the plastic mounting bracket 304. This configuration can be reversed should the design require so that the anode disc 300 can float vertically up and down to follow the surface reduction of the cathode disc 502 in order to keep the gap between the anode disc 300 and cathode disc 502 constant. The electrolyte is extruded from the cathode assembly. In one embodiment, the anode disc and the cathode assembly are side-by-side. In another embodiment, the anode disc is disposed above the cathode assembly.

Figure 7A:
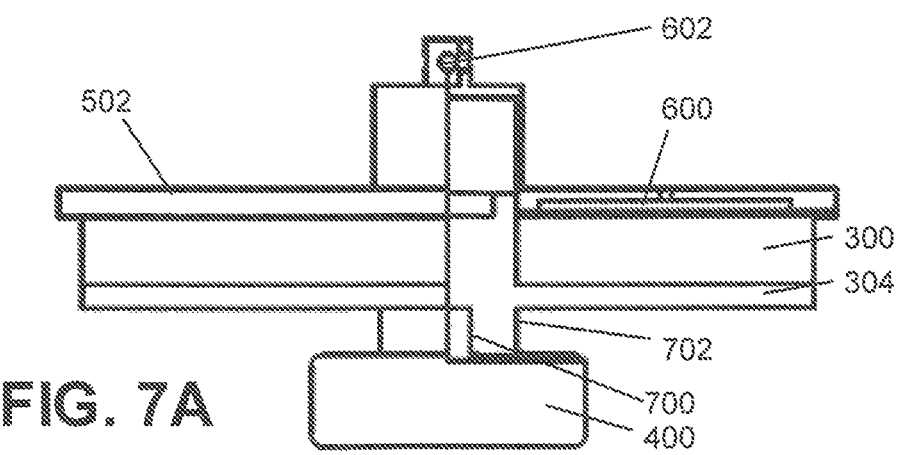
FIG. 7A is a profile view of an anode disc.
Figure 7B:
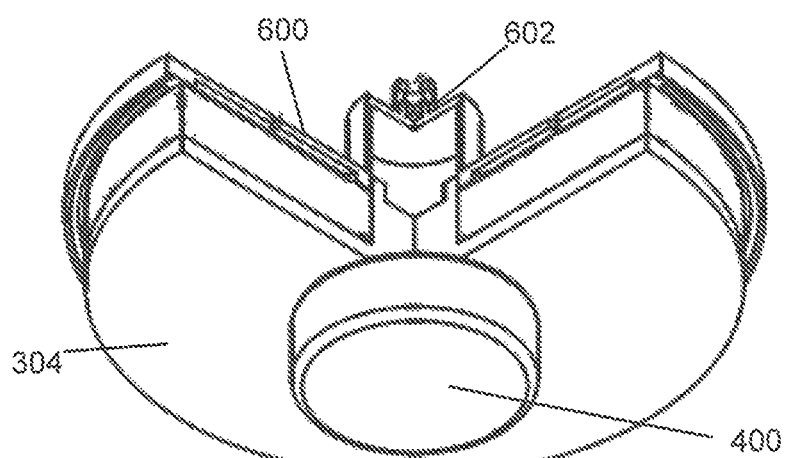
FIG. 7B is a bottom perspective view of the anode disc.
Figure 7C:
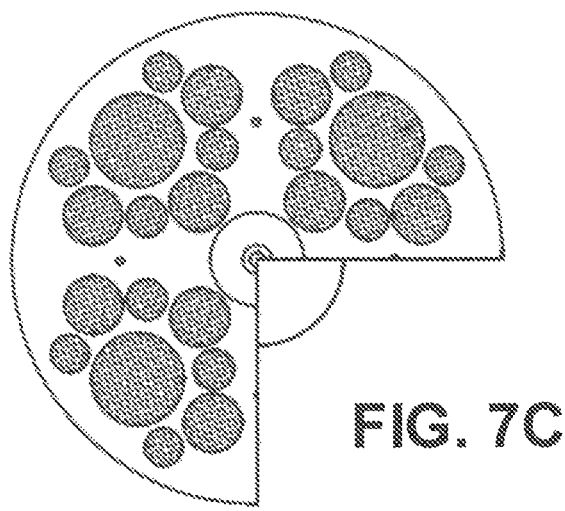
FIG. 7C is a bottom view of the anode disc.

With reference to FIG. 7A, FIG. 7B and FIG. 7C, one embodiment of a single disc metal battery system is shown. The anode disc 300 is a 5000 or 6000 series aluminum disc bonded or glued to an injection molded round PVC plastic mounting base that functions as the plastic mounting bracket 304. At the center of the plastic mounting bracket 304 is a circular mounting point 700 with groves that allow for mechanical attachment using ball bearings to the motorized arm 400. A commutator ring brush 702 is molded into the plastic mounting bracket 304 that electrically connects to the anode disc 300. The commutator ring brush 702 has brushes running on its surface that communicate the electric current to a stationary portion of the motor drive for the purposes of completing the battery circuit. The graphite commutator brushes are similar to those found on DC motors and can be retracted for the purposes of loading and unloading new discs. In the embodiment of FIG. 7C, an electrical collector mesh grid is disposed on a back surface of the cathode and provides a hatch-like appearance.

At the start of operation, the motorized arm 400 moves under a disc storage column (not shown) where a new disc is loaded onto the motorized arm 400. The motorized arm 400 then moves horizontally where it moves up to engage the center of the cathode disc. The metal air battery is started by pumping electrolyte into the channels 600 on the surface of the cathode disc 502 thereby floating it at a fixed distance from the metal anode disc 300. The current starts to flow immediately and the metal anode disc 300 is spun at a few hundred rpm (e.g. 200 rpm to 500 rpm) to facilitate removal of electrolyte from the edges of the disc and provide for active knock out of any gas produced by the system. This low rpm spin also facilitates even galvanic corrosion of the metal surface keeping the discs smooth and of even height during operation. The vertical movement of the spinning anode disc or the cathode disc maintains constant electrode gap during operation allowing for thick metal anodes to be used in the battery without increase in resistance due to corrosion of standard fixed anode metal air battery systems. The system as described in U.S. Pat. No. 4,053,685 shows how movement of the cathode and anode provides for higher efficiency and allow the use of a much thicker metal anode in a single cell system.

To shut down the metal air battery the electrolyte pump is turned off and the anode disc 300 is lowered away from the cathode disc 502 and simultaneously spun up to thousands of rotations per minute (rpm) (e.g. over 1000 rpm for large discs or over 2200 rpm for smaller discs) and moved horizontally away from the cathode disc 502. This is done to spin the metal surface dry of the electrolyte. This drying occurs rapidly on the anode disc 300 while simultaneously removing residue electrolyte that drips from a now-empty cathode disc 502. In other embodiments, the cathode disc 502 can also be spun dry in a similar fashion should movement of the anode disc 300 be restricted. Other mechanical configurations can be incorporated into the system to accomplish this. For example the anode disc 300 can be moved out from under the cathode disc 502 to prevent dripping onto the anode surface after shutdown. Additionally or alternatively a door or other barrier may be introduced between the anode disc and the cathode disc to prevent drips of electrolyte onto the anode surface. A mechanical wiper could also be used to remove residue electrolyte from the surface of the cathode or the system can be turned completely upside down to prevent gravity drips onto the surface of the anode. In some embodiments of the metal air battery it is desirable to utilize the high "g" spin up of the anode disc and cathode disc to stop all chemical reactions immediately. Whether the cathode or anode moves back and forward or up and down is secondary to the spin dry cycle on the respective disc. One major advantage of this spin dry method is there is no need for any type of edge treatment of the anode disc 300 in order to prevent the parasitic corrosion due to the fact the edge of the disc sees the highest G-force. This completely eliminates the liquid-tight seals used by many conventional systems. The elimination of this seal provides for the easy installation of the discs as opposed to the installation of flat plate electrodes that require perfect seals as found on standard metal air battery systems. In the past the perfect seal of square metal plates usually required manual installation in a shop environment.

The motorized arm 400 used for spin control of the anode disc 300 is of a flat "pancake" style in order to reduce package depth of the complete system. The motorized arm 400 operates under the very low friction of the liquid bearing during operation. Disc inertia during spin dry permits a relatively small motor with low current draw to still be suitable. The horizontal positioning of the spin motor/disc platform can be accomplished using a small stepper motor of the type found in scanners or office printers.

The cathode disc 502 can be manufactured from either low-cost charcoal matrix with embedded metal wire charge collectors or a conductive silicone-based material with embedded metal wire charge collators. Other cathode materials well known to those skilled in the art can be applied to manufacture of the cathode disc 502. Unique to the disclosed cathode disc 502 is the liquid bearing channel 600, through which electrolyte is pumped during operation. These liquid bearing channels 600 are either machined or molded into the cathode disc 502 at time of manufacture and are positioned and sized for maximum hydrodynamic and/or hydrostatic lift using the minimum electrolyte flow. A hydrostatic force is produced when the electrolyte fluid is emitted from the liquid bearing channel 600 and the anode disc may, or may not, be rotating. A hydrodynamic force is produced when the electrolyte fluid contacts a rotating disc. The hydrodynamic force self-stabilizes the rotating of the disc to maintain an even gap during operation of the air metal battery. In one embodiment, the gap is between 1-2 mm. In other embodiments that utilize large discs, the gap may be 3-5 mm. This constant gap, combined with the rotation of the disc, permits even scanning of the disc. This promotes symmetrical consumption of the disc.

Figure 11A:
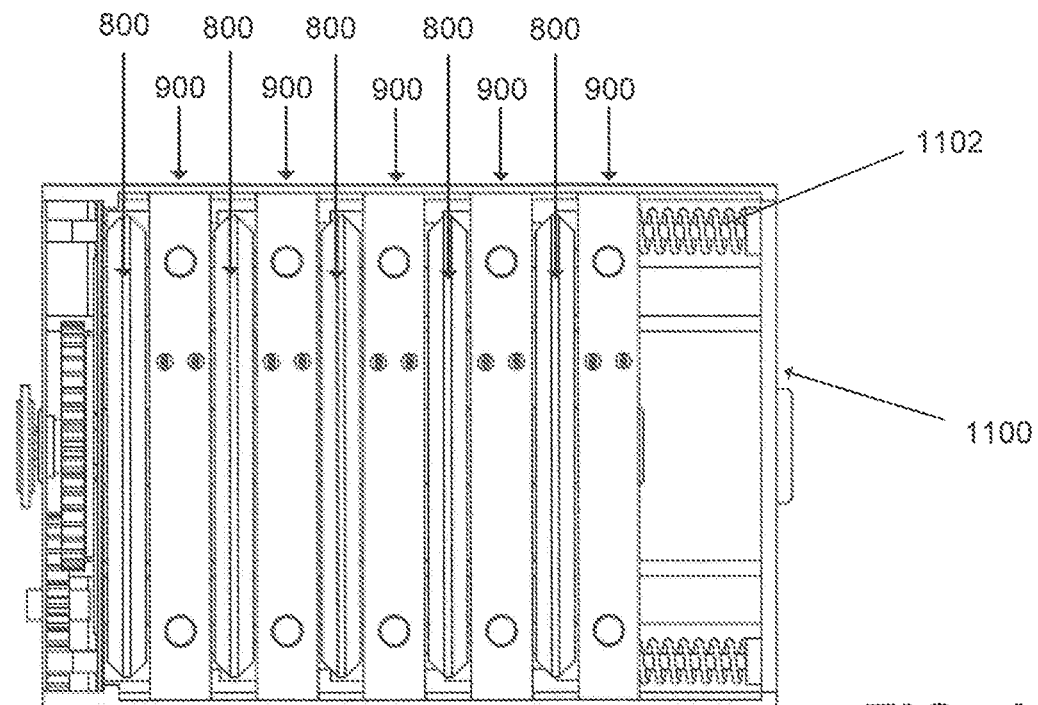
FIG. 11A depicts a top view of the metal air battery.
Figure 11B:
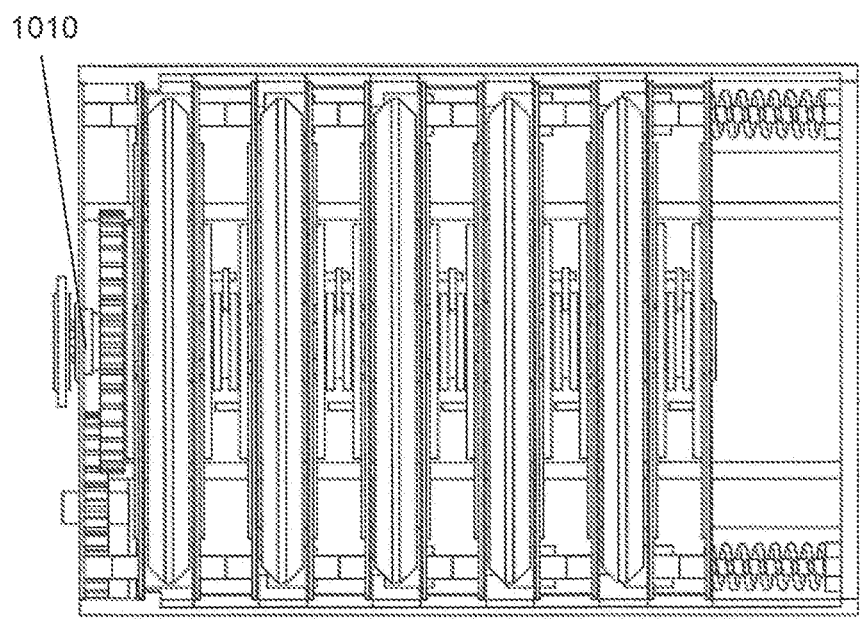
FIG. 11B is a cross section view of the metal air battery of FIG. 11A.

The liquid bearing channels 600 are also positioned to facilitate an even electric field over one section of the cathode disc 502 that, during rotation, "scans" the surface of the anode disc 300 during one rotation providing for even chemical milling of the anode surface. In the embodiment depicted, four channels are illustrated at 90 degree angles. By way of illustration and not limitation, a battery that uses seven inch (17.8 cm) anode disc may use channels of one quarter inch (0.64 cm) wide and two inches (5 cm) long. For larger discs the relative sizes would be approximately the same. The channels are also positioned to facilitate an even electric field over one section of the cathode that during rotation "scans" the surface of the complete metal anode during one rotation providing for even chemical milling of the anode surface. During operation the force of the end springs of is supported by the electrolyte liquid bearing so that no Anode surface is in actual contact with the Cathode surface and instead has a liquid gap of around 1 mm during operation. The drive motor for the anode discs is mounted on the end casing with the anode discs interlocking to provide a shaft that communicates mechanical power to each disc (FIG. 11A and FIG. 11B).

The cathode disc 502 is mounted in such a manner that it can be raised up and away from the spinning anode disc 300 to allow for the anode disc 300 to move out from under the cathode assembly. This is accomplished by a magnetic solenoid or electric motor system. During operation the weight of the cathode disc 502 is supported by the electrolyte liquid bearing and therefore has no active motor control outside of the electrolyte feed pressure that is determined by the electrolyte feed pump during static bearing operation or the hydrodynamic action of the electrolyte against the anode disc 300.

The motorized arm 400 can be mounted to a single arm pivot 500 (see FIG. 5) that moves the anode disc 300 back and forth under the disc load-unloading mechanism to and from the cathode disc 502. This design allows for compact storage of new discs and complete dry storage of current loading by spun dry discs. By spinning both the cathode disc 502 and anode disc 300 an alternate configuration that eliminates the need for horizontal drive can be achieved. Both systems can be chosen or adapted to a variety of applications and chosen to facilitate integration into other systems. Both solutions are equal in start-stop capabilities.

Figure 8A:
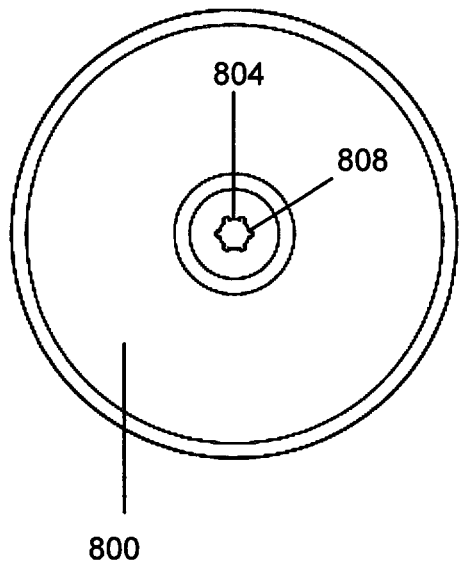
FIG. 8A is a bottom view of a two-sided anode disc.
Figure 8B:
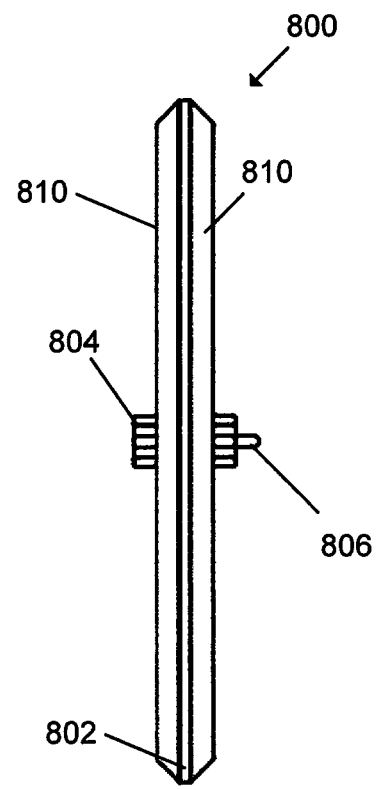
FIG. 8B is a side view of the anode disc.

In one embodiment, the battery comprises an anode disc 800 that has two opposing metallic surfaces 810 bonded to a plastic mounting bracket 802 of the same diameter as the anode disc 800. See FIG. 8A and FIG. 8B. In the center of the anode discs 800 is a stub shaft 804 with spring loaded conductor 806 attached to the stub shaft 804 with splines 808 that index to corresponding slots. This spring-loaded conductor 806 is mounted on one side of the anode disc 800 such that it is electrically connected to the anode discs 800.

Figure 8C:
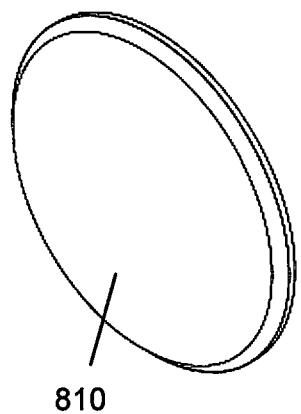
FIG. 8C is a perspective view of an anode disc.
Figure 8D:
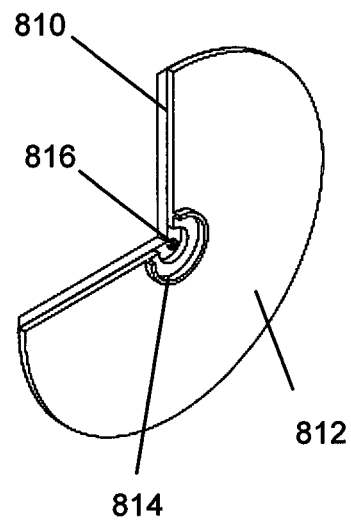
FIG. 8D is a perspective view of an anode disc mounted to a plastic mounting bracket.

The anode discs 800 are loaded between cathode assemblies like cheese between two slices of bread. In another embodiment, as shown in FIG. 8C and FIG. 8D the anode discs 800 are bonded on one side to a plastic mounting bracket 812 that has a shape that will mechanically or magnetically attach by an attachment 814 to a central stub shaft 816. Located at the center of the aluminum anode is a spring contact that provides for electrical connection between the aluminum anode and the motor shaft. The motor shaft conducts current from the aluminum to the battery system for hook up in either series or parallel current.

Figure 9:
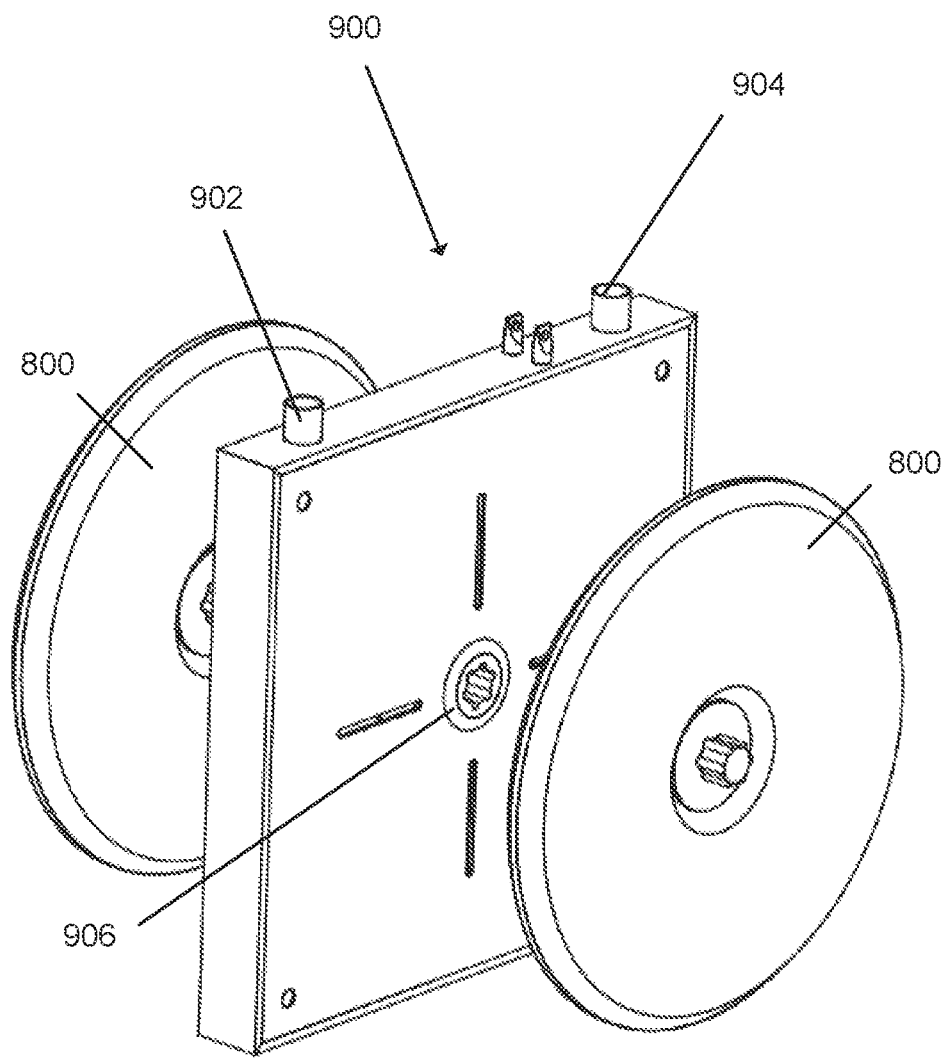
FIG. 9 is an exploded view of a metal air battery showing a cathode assembly flanked by two anode discs.

As shown in FIG. 9, a cathode assembly 900 is flanked by two adjacent anode discs 800. An exploded view of the cathode assembly 900 is shown in FIG. 10. The cathode assembly 900 has an interior air space sealed to keep electrolyte out of the interior air space. On the top is an air inlet 902 and air outlet 904 so a fan (e.g. air blower 104) can move air in and out of the inner air space to provide oxygen to the back surface of the cathode assembly 900. The electrodes are mounted on opposite sides of the air chamber are on different parts of the circuit and do not electrically connect with each other. The electrode material is supported on metal plates with pores to provide areas for oxygen exchange from inside the air space.

Figure 10A:
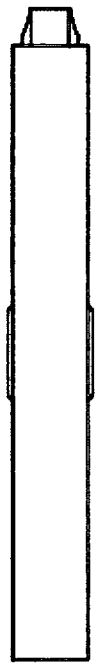
FIG. 10A is a side view of a cathode assembly.
Figure 10B:
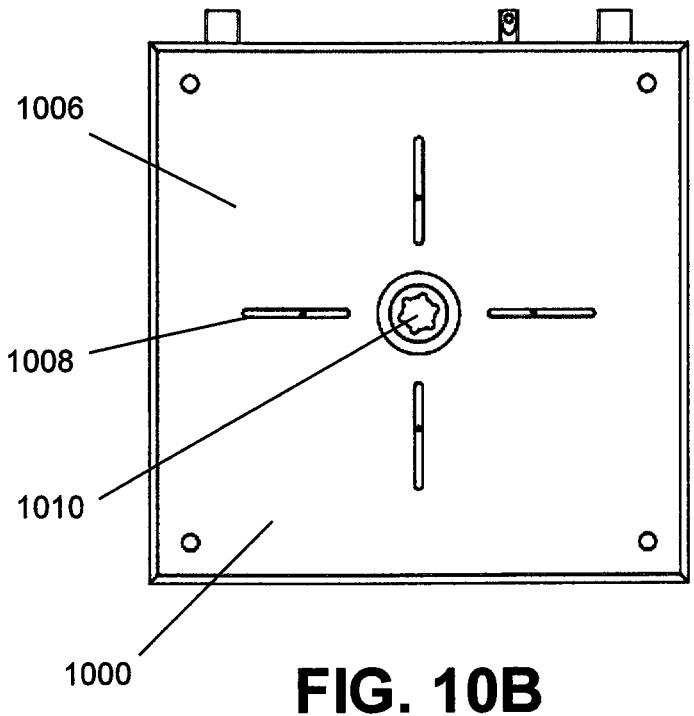
FIG. 10B depicts an external face view of the cathode assembly.
Figure 10C:
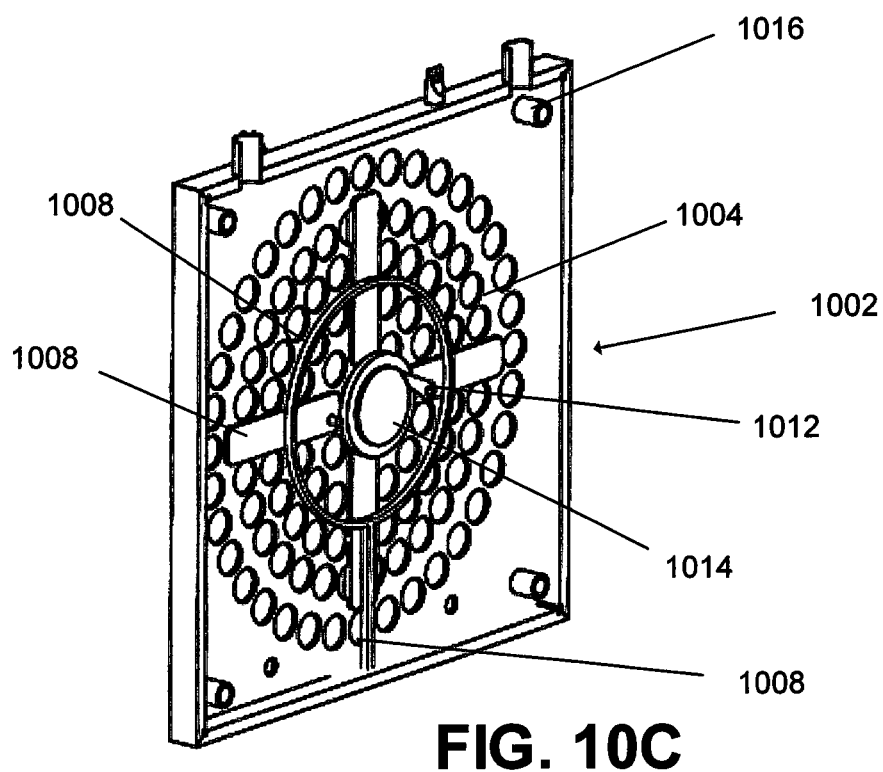
FIG. 10C is an internal view of half of the cathode assembly showing its internal structure.

As shown in FIG. 10A, 10B and FIG. 10C the cathode assembly 900 with a surface 1000 comprised of a carbon-based powder with hydrophobic binder and catalyst material(s) that provides for rapid Oxygen Reduction Reaction (ORR). Such materials are known in the art. The cathode assembly 900 is double sided with metal plates 1002 on either side. The surface 1000 has a conductive charge collecting screen 1004 that allow oxygen to permeate the surface 1000. On the external surface 1006 of the metal plate 1002 can be found four indented liquid bearing channels 1008 evenly spaced as a cross. These channels 1008 are connected to one or more tubes that carry electrolyte to the anode disc 800 for the purpose of power production, cooling and lubrication as a liquid bearing. Inside the cathode assembly 900 is a rotating spin shaft 1010 mounted on sealed bearings that communicates rotating power from one anode disc to the next (e.g. see the two anode discs 800 in FIG. 9). In one embodiment, a thrust bearing it used. The thrust bearing may be a hydrostatic or hydrodynamic thrust bearing that uses the electrolyte as a working fluid. The spin shaft 1010 also has an electrical charge collector such as an outer copper raceway or conductive mesh. The electrical charge collector connects to a sliding conductor 1012 (e.g. carbon brushes or similar structure) for current collection from the anode disc 800. This current is communicated to the cathode assembly 900 that is opposite the corresponding metal screen allowing for series power connection within the multiple cell configuration of the metal air battery.

Figure 10D:
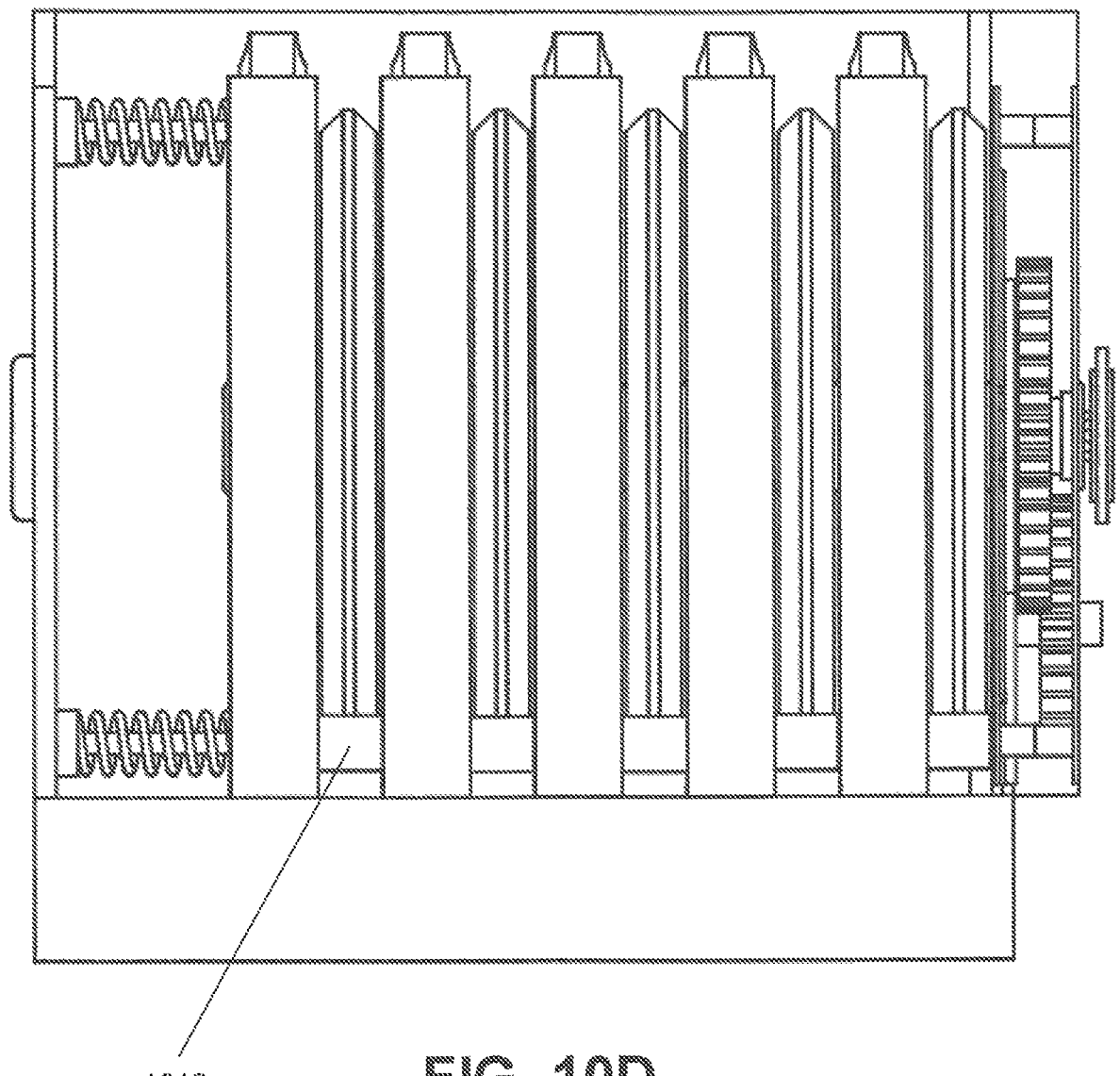
FIG. 10D shows a side, cross section view of a metal air battery.

At the center of each cathode assembly is a sealed bearing on each side into which is mounted a spin shaft. This spin shaft 1010 contains the commutator ring for electrical connection to one of the two cathode surfaces. The commutator brush 1014 is mounted directly to one of the metal plates providing electrical connection directly to the cathode. Four through holes 1016 at the base of each cathode assembly are connected to four support rods that allow for free movement of the cathode assemblies relative to each other. This movement facilitates the change in thickness of each anode disc as the metal is consumed during battery operation. As shown in FIG. 10D, on the lower set of support rods are electromechanical spacers 1018 that push the cathodes apart for removal of spent anode disc and the loading of new fresh anode discs. The cathodes are opened in sequence to limit the housing space required for the total bundle of cells.

FIG. 11A depicts a top view of an air metal battery assembly that comprises a plurality of air metal battery cells. As shown in FIG. 11A, the anode discs 800 and cathode assemblies 900 are connected inside a housing 1100 that provides for liquid electrolyte containment. In the bottom of the housing 1100 is an electrolyte collection pan (not shown in FIG. 11A but see electrolyte collection pan 1204 of FIG. 12) that collects used electrolyte from each cell where it drains into a common pump intake 1206 and is sent for reconditioning before being reintroduced into the cell chambers. The cathode discs 908 are mounted on a non-conducting cathode support rods 1208 that allow free movement back and forth. The anode discs 800 are mounted between the cathode assemblies 900 inside with the first disc directly driving from one single common motor. Each cathode disc is pushed gently proximate a surface of the corresponding anode disc 800 by four compression springs 1102 on the cathode support rods 1208 located at the end opposite to the drive motor. There is enough space left at the spring-end so that any two cathode assemblies 900 can be moved far enough apart to allow the removal and installation of anode discs 800. During operation the electrolyte pumped into the liquid bearing system pushes the cathode assemblies 900 apart with the slack being taken up by the compression springs 1102 so the same cathode-anode gap is maintained during operation.

FIG. 11B is the same top view except the tops of the cathode assemblies 900 has been cut away to illustrate the internal system. The spin shaft 1010 and commuter brush 1014 are illustrated.

Figure 12:
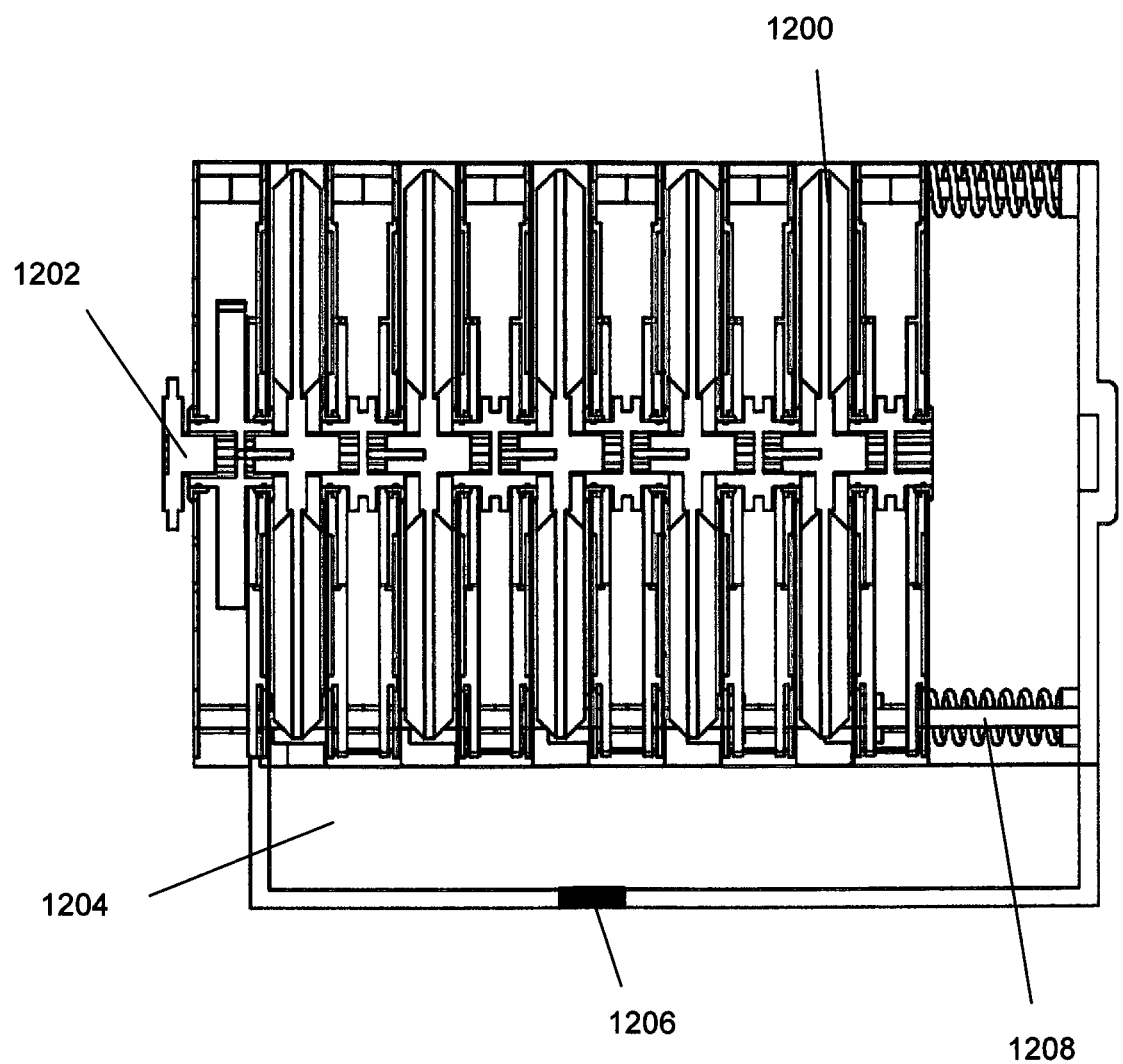
FIG. 12 is a side view of an air metal battery assembly with multiple cells.
Figure 13:
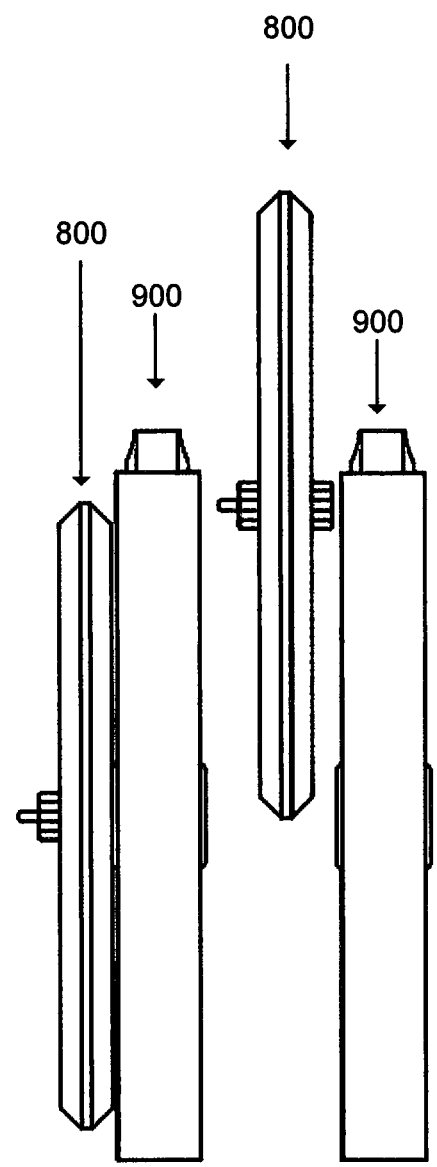
FIG. 13 depicts the removal of an anode disc from adjacent cathode assemblies.

To start the metal air battery liquid is pumped into the cathode channels 600 until the anode discs 800 are suspended in a liquid bearing. The main drive motor is started and turns at a slow 100 to 200 rpm. Power is routed out of the battery at the center shaft 1202 (see FIG. 12) for negative and, in the opposite case, last cathode assembly 1200 for positive. See FIG. 12 which are cross section side views of the device. FIG. 12 depicts the electrolyte collection pan 1204. The metal air battery is shut down by turning off the main drive motor and, a few seconds later, the electrolyte pump. Next electromechanical spacers 1018 move the cathode assemblies 900 away from the surface of the anode discs 800 at which time the main drive motor is started and spins up the anode discs 800 to over 2500 RPM in order to wipe clean the surface of each disc using centrifugal force. The battery can be generally turned on and off in a few seconds (e.g. less than ten seconds) and will operate until the metal on the anode discs is used up or the electrolyte is exhausted. For large discs, thirty seconds may be necessary. The ability to quickly turn the air metal battery is advantageous because this reduces the production of excess hydrogen and avoids damaging the anode disc. Advantageously, the floating nature of the anode discs 800 permits their easy replacement. See FIG. 13.

Figure 1:
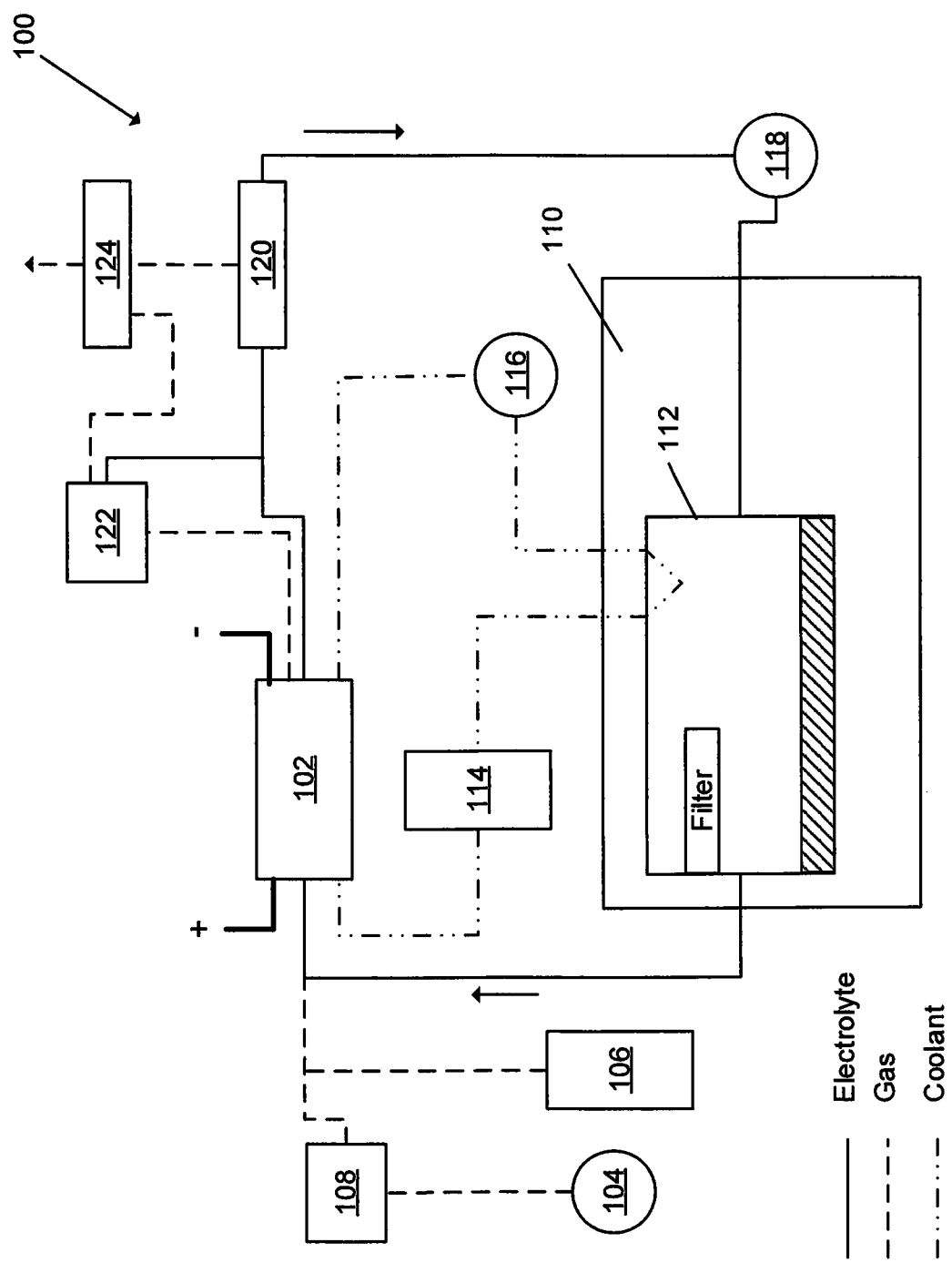
FIG. 1 is a schematic depiction of a system that utilizes a metal-air battery.
Figure 2:
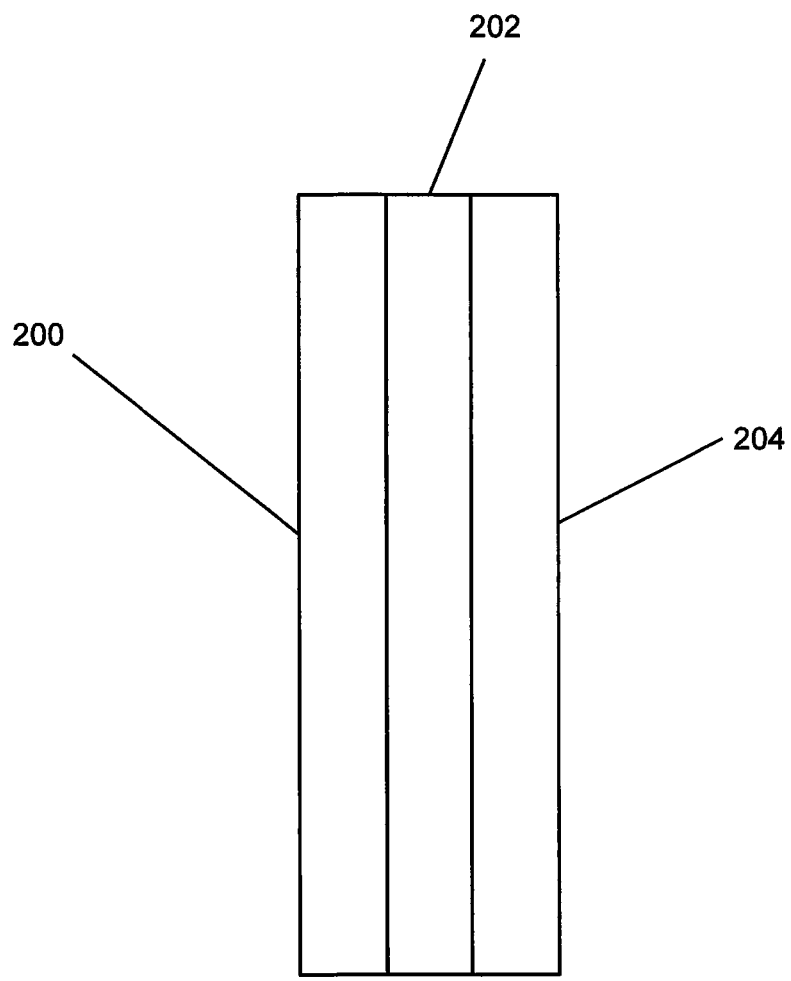
FIG. 2 is schematic of a metal-air battery.
Figure 14A:
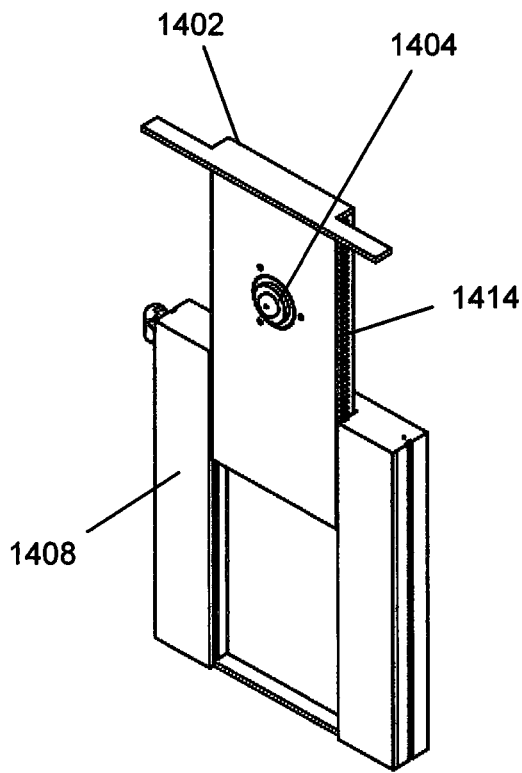
FIGS. 14A, 14B and 14C depict a sliding load cartridge for use with the disclosed air metal battery.
Figure 14B:
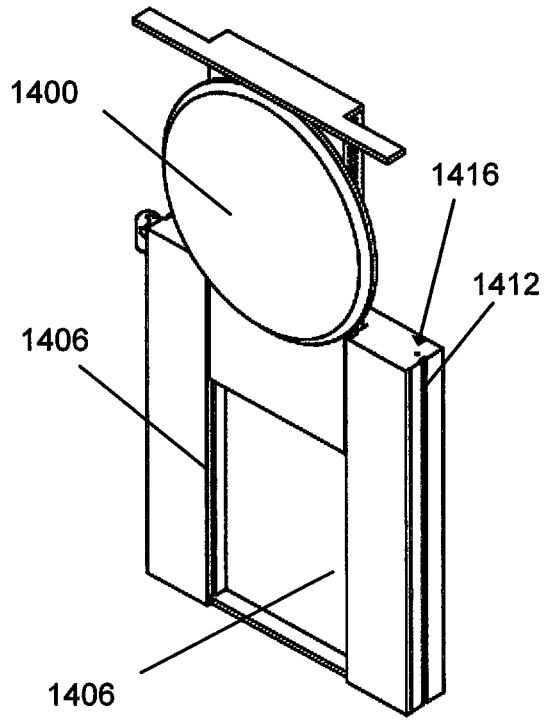
Figure 14C:
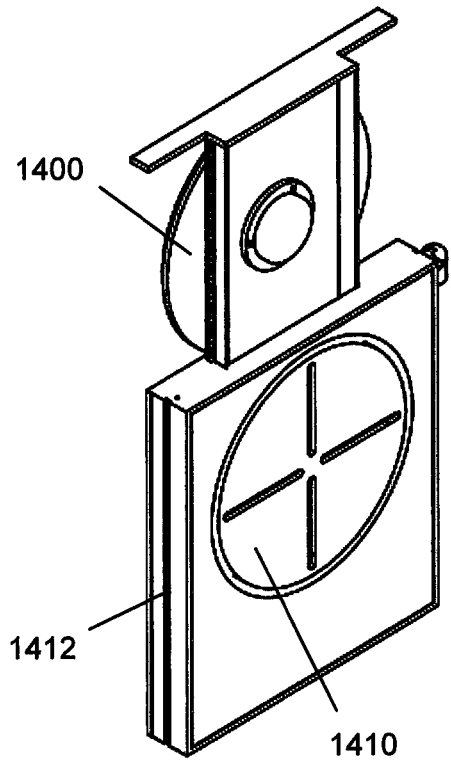
Figure 16A:
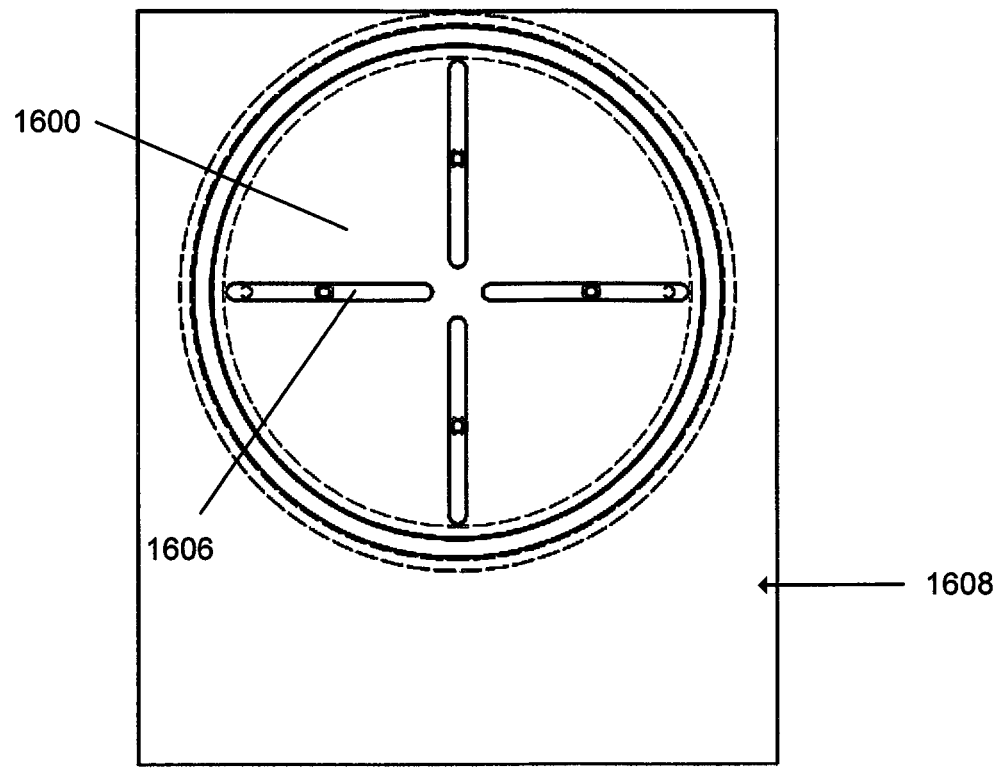
FIG. 16A and FIG. 16B show the cathode assembly for use with the sliding load cartridge.
Figure 16B:
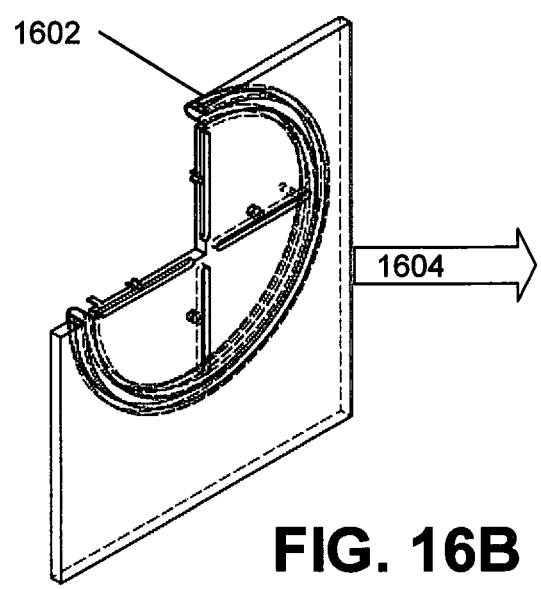

As shown in FIG. 14A, FIG. 14B and FIG. 14C, the anode disc 1400 may be mounted to a sliding load cartridge 1402 that allows for removal and load of anode discs 1400 in seconds. The load cartridge 1402 contains once central disc drive motor 1404 with associate wiring. Incorporated into the edge of the load cartridge 1402 is a rack gear 1414 that meshes with a pinion gear motor 1502 (see FIG. 15B) mounted to a cartridge drive motor (not shown) that will raise and lower the load cartridge 1402. The load cartridge 1402 runs on two tracks 1406 found on cell module case 1408. The cell module case 1408 has a cathode 1410 attached to the rear face so that it comes in contact with an adjacent anode disc from an adjacent cell module. The cell modules are designed to be inserted into an enclosure that contains supporting systems equipment necessary to operate an air metal battery (see FIG. 1). Each single cell module has groove tracks 1412 on either side of the cell module case to allow for alignment of the cell within the outer housing. These groove tracks 1412 are spaced exactly so that one cell brings an anode disc close to a surface of the corresponding cathode in the adjacent module.

As shown in FIG. 15A, FIG. 15B and FIG. 15C, on one side of the cell module case 1408 is an air inlet 1500 that allows pressurized air into a sealed air chamber 1506 with one wall 1510 being the cathode 1508. This supplies air to the surface of the cathode to facilitate Oxygen Reduction Reactions (ORR). Also mounted inside is the rack and pinion gear motor 1502 to move the load cartridge 1402 for disc removal and loading. On the bottom of the cell module case 1408 is an electrolyte inlet 1504 fitting that connects with an electrolyte manifold and brings fresh electrolyte into the module where it is sent via a flexible tube (not shown) to the back end of the cathode during operation of the battery.

The cathode 1600 comprises a circular air breathing plate of carbon material containing a catalyst that allows for ORR. The circular cathode is hydrophobic in that it prevents the liquid electrolyte from leaking into the sealed air chamber 1608. Surrounding and supporting the cathode is a seal 1602 (e.g. an elastomeric material such as a silicone seal) incorporating a bellows loop that allows for forward movement of the cathode in the direction of arrow 1604 in response to differential air pressure. In another embodiment, an electromechanical actuator is used to control movement of the cathode surface in the direction of arrow 1604. Molded into a surface of the cathode 1600 are four channels 1606 space at ninety degrees to each other with central holes that supply liquid electrolyte to the surface of the cathode 1600. This electrolyte forms a hydrodynamic bearing between the surface of the stationary cathode 1600 and a rotating anode disc maintaining a gap between the surfaces of about one-sixteenth of an inch (0.16 cm). The cathode 1600 is pushed toward the anode by the higher pressure from the air supply behind the cathode plate so that as the anode is consumed the gap is maintained.

FIG. 17A, FIG. 17B and FIG. 17C show a complete battery is assembled from individual cell modules inserted into the battery housing as shown in. The cell modules are arranged so the previous cell's anode disc faces a cathode on the backside of the next cell module. Mounted on the battery case is a fan (not shown) that intakes ambient air and forces it into the cathode air chambers at air inlet 1700 where the oxygen is consumed at the back surface of the cathode electrode. The air is bled slowly out of the top of the cathode housing through a small bleed hole 1416 one-sixteenth of an inch (0.16 cm) in diameter. The bleed hole 1416 allows the nitrogen left in the air supply to be removed allowing for new oxygen in fresh air to reach the cathode surface while still restricting enough the airflow to provide elevated air pressure to push the cathode towards the surface of the anode disc. On each end of the battery cell bundle is one cell module without the cathode where power is connected to the positive copper terminal and on the other end of the battery cell bundle a cell module without an anode disc where power is connected to the negative copper terminal. These cell modules are identical to the others but are either missing a cathode or an anode depending on what side of the bundle they are mounted. The battery is normally connected in series with the power from the previous cathode routed to the next anode disc.

As shown in FIG. 17C, on the base of the battery housing is an electrolyte collection pan 1702. This pan has a small pump 1704 that supplies electrolyte to each cell module along a common manifold below each cell. There is also an air duct from the airside fan plenum 1706 that blows out fresh air through the electrolyte plumbing to clear the lines dry and provide fresh drying air to the surface of the anodes.

Figure 18C:
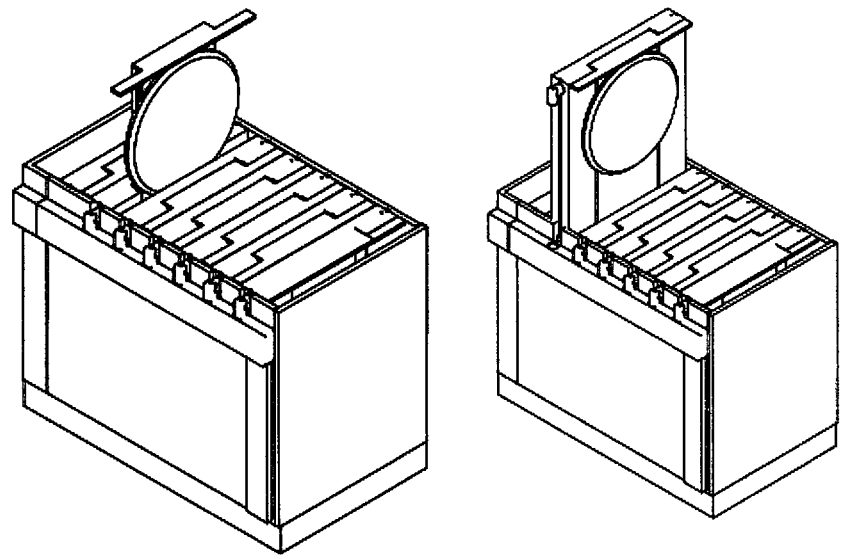
FIG. 18C shows the metal air battery in a closed state.
Figure 18C:
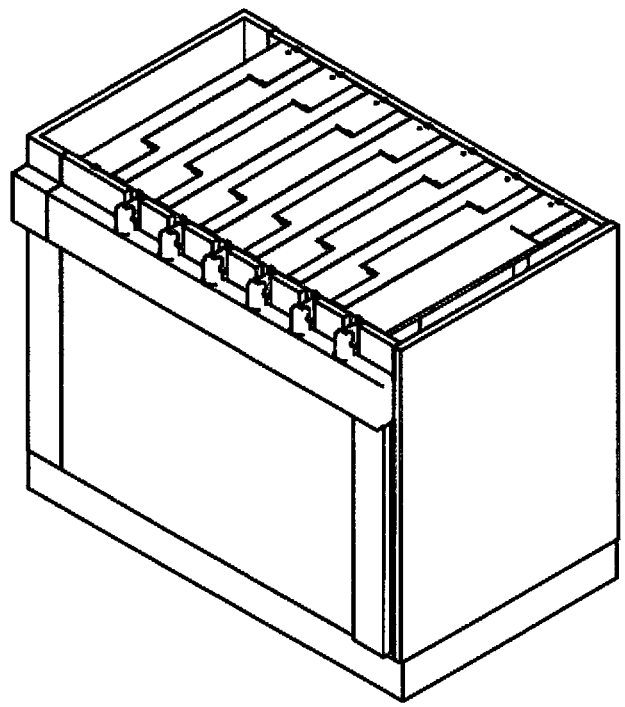
Figure 19A:
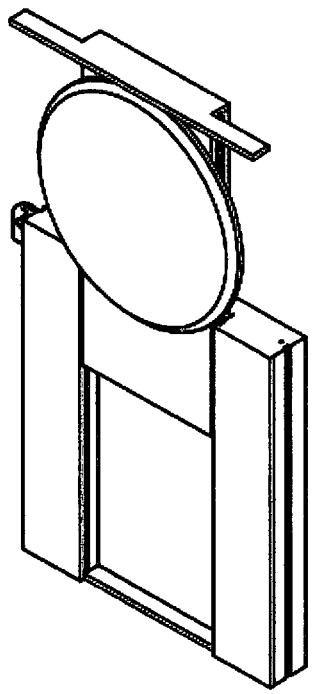
FIG. 19A, FIG. 19B and FIG. 19C are alternate views the sliding load cartridge.
Figure 19B:
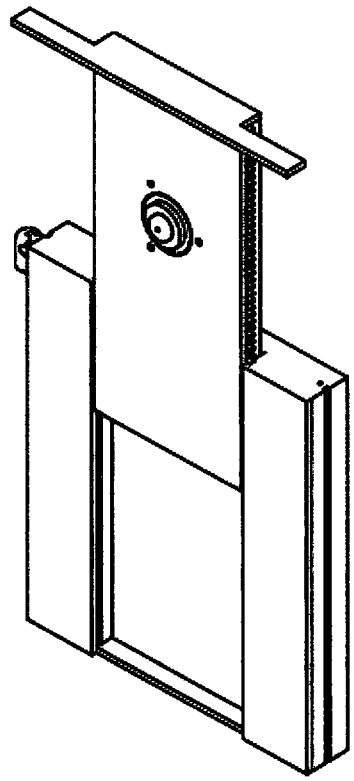
Figure 19C:
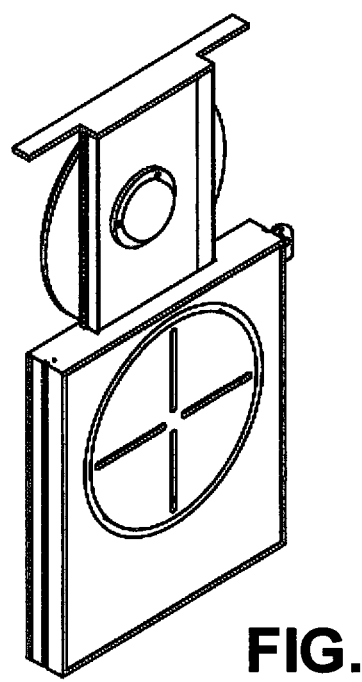

The battery cell bundle allows for individual change out of either a disc or complete cell module quickly as shown in FIG. 18A and FIG. 18B. Each anode disc is manually removed from its motor mount and replaced with a fresh anode disc. The system then retracts the anode disc into the cell in preparation of battery start. If a problem is encountered with any of the cell modules they can be changed out for a new one quickly. The air and electrolyte are plug fixtures facing down so they do not interfere with the removal of or installation of new cell modules. FIG. 19A, FIG. 19B and FIG. 19C depicts a complete cell module in further detail.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An air metal battery comprising:
   a cathode assembly having a cathode surface, the cathode assembly comprising fluid path for pumping an electrolyte fluid through the cathode assembly and out of the cathode surface, thereby producing a hydrostatic force at the cathode surface;
   an anode disposed proximate the cathode surface, the anode being positioned proximate to the cathode assembly by a thrust bearing that permits the anode to rotate relative to the cathode assembly;
   a shaft for rotating the thrust bearing, the shaft being in contact with a sliding conductor that collects electrical charge;
   wherein, during operation of the air metal battery, the anode remains spaced from the cathode surface by a constant distance due to a hydrodynamic force of the electrolyte fluid.

2. The air metal battery as recited in claim 1, wherein the cathode assembly further comprises an air chamber with an air inlet and an air outlet for conveying oxygen through the air chamber and out through the cathode surface.

3. The battery assembly as recited in claim 2, wherein the cathode assembly further comprises a bellows loop that circumscribes the cathode surface, the bellows loop allowing for movement of the cathode surface in response to changes in gas pressure in the air chamber.

4. The air metal battery as recited in claim 1, wherein the anode is an anode disc.

5. An air metal battery comprising:
   an anode disc, a cathode and an electrolyte fluid,
   the cathode assembly having a cathode surface and an electrical collector for collecting electricity generated by the air metal battery, the cathode assembly comprising fluid path for pumping the electrolyte fluid through the cathode assembly and out of the cathode surface, thereby producing a hydrostatic force at the cathode surface;
   the cathode assembly further comprising an air chamber with an air inlet and an air outlet for conveying oxygen through the air chamber and out through the cathode surface;
   an anode disposed proximate the cathode surface, the anode being positioned proximate to the cathode assembly by a thrust bearing that permits the anode to rotate relative to the cathode assembly;
   a shaft for rotating the thrust bearing, the shaft being in contact with a sliding conductor that collects electrical charge;
   wherein, during operation of the air metal battery, the anode disc remains spaced from the cathode surface due to a hydrodynamic force of the electrolyte fluid.

6. The battery assembly as recited in claim 5, wherein the cathode assembly further comprises a bellows loop that circumscribes the cathode surface, the bellows loop allowing for movement of the cathode surface in response to changes in gas pressure in the air chamber.

7. The battery assembly as recited in claim 6, wherein the bellows loop comprises an elastomeric material.

8. The battery assembly as recited in claim 5, wherein the cathode assembly and the anode disc are housed within a sliding load cartridge.

9. The battery assembly as recited in claim 5, wherein the sliding conductor is a carbon brush.

10. A battery assembly comprising
    a housing enclosing multiple air metal batteries and an electrolyte fluid, each air metal battery in the multiple air metal batteries having an anode disc and a cathode assembly wherein:
    the cathode assembly has a cathode surface and an electrical collector for collecting electricity generated by the air metal battery, the cathode assembly comprising fluid path for pumping the electrolyte fluid through the cathode assembly and out of the cathode surface, thereby producing a hydrostatic force at the cathode surface;
    the cathode assembly further comprising an air chamber with an air inlet and an air outlet for conveying oxygen through the air chamber and out through the cathode surface;
    an anode disposed proximate the cathode surface, the anode being positioned proximate to the cathode assembly by a thrust bearing that permits the anode to rotate relative to the cathode assembly;
    the battery assembly further comprises a shaft for rotating each thrust bearing in the multiple air metal batteries, thereby rotating each anode disc, wherein the shaft is in contact with a sliding conductor in each air metal battery, each sliding conductor collecting electrical charge;
    wherein, during operation of the air metal battery, each anode disc remains spaced from a corresponding cathode surface due to a hydrodynamic force of the electrolyte fluid.

11. The battery assembly as recited in claim 10, further comprising at least one compression spring that compresses each air metal battery against an adjacent air metal battery.

12. The battery assembly as recited in claim 10, wherein each air metal battery in the multiple air metal batteries comprises a sliding load cartridge.

13. The battery assembly as recited in claim 10, wherein the cathode assembly of each air metal battery further comprises a bellows loop that circumscribes the cathode surface, the bellows loop allowing for movement of the cathode surface in response to changes in gas pressure in the air chamber.

14. The battery assembly as recited in claim 13, wherein the bellows loop comprises an elastomeric material.

15. A method for operating the air metal battery as recited in claim 1, further comprising generating electricity with the air metal battery by:
   pumping the electrolyte fluid through the fluid path to apply the hydrostatic force and thereby space the anode from the cathode surface;
   rotating the shaft at a predetermined rate such that the anode rotates at a rate of between 200 rotations per minute and 500 rotations per minute.

16. A method for operating the air metal battery as recited in claim 1, further comprising a step of turning the air metal battery off by:
   rotating the shaft at a second predetermined rate such that the anode rotates at a rate of at least 1000 rotations per minute;
   stopping electrolyte fluid from pumping through the fluid path, thereby spin drying the anode to remove the electrolyte fluid.

17. The method as recited in claim 16, wherein the step of turning the air metal battery off turns the metal air battery off in less than thirty seconds.

18. The method as recited in claim 16, wherein the step of turning the air metal battery off turns the metal air battery off in less than ten seconds.

19. The method as recited in claim 16, wherein the step of rotating the shaft rotates at a rate of at least 2200 rotations per minute.

\* \* \* \* \*